United States Patent

Baesecke

[11] Patent Number: 5,840,401
[45] Date of Patent: Nov. 24, 1998

[54] SEALING PROFILE FOR MOTOR VEHICLES

[75] Inventor: Karl Baesecke, Bad Salzdetfurth, Germany

[73] Assignee: Meteor Gummiwerke K. H. Badje GmbH & Co., Bockenem, Germany

[21] Appl. No.: 817,724
[22] PCT Filed: Jul. 27, 1996
[86] PCT No.: PCT/EP96/03323
  § 371 Date: Apr. 23, 1997
  § 102(e) Date: Apr. 23, 1997
[87] PCT Pub. No.: WO97/08003
  PCT Pub. Date: Mar. 6, 1997

[30] Foreign Application Priority Data

Aug. 24, 1995 [DE] Germany .................. 195 31 167.1

[51] Int. Cl.⁶ ............................................... E06B 7/23
[52] U.S. Cl. ................................... 428/122; 49/490.1
[58] Field of Search ........................... 428/122; 49/490.1

[56] References Cited

FOREIGN PATENT DOCUMENTS

| | | | |
|---|---|---|---|
| 28 42 207 | 4/1979 | Germany | B60R 13/00 |
| 32 27 885 | 3/1983 | Germany | B60R 13/06 |
| 3147801 A1 | 6/1983 | Germany . | |
| 33 46 070 | 8/1985 | Germany | B60R 13/06 |
| 41 21 552 | 1/1992 | Germany | B29C 47/02 |
| 29 24 574 | 5/1993 | Germany | F16J 15/10 |

*Primary Examiner*—Alexander Thomas
*Attorney, Agent, or Firm*—Synnestvedt & Lechner

[57] ABSTRACT

Sealing profile for motor vehicles and method of manufacture thereof. The sealing profile (1) comprises a retaining part (2) of U-shaped cross-section and sealing parts (3, 4) formed thereon. On an inner surface (13) of a bridge (5) of the retaining part (2) there is positioned an elastomeric mixture which can be vulcanized to a permanently elastic, permanently adhesive and open-cell foamed sealing strand (14). The sealing strand (14) is deformed during the fitting of the sealing profile (1) by a bodywork flange of a motor vehicle. In this way the retaining part (2) provides a reliable seal relative to the flange.

26 Claims, 5 Drawing Sheets

SEALING PROFILE FOR MOTOR VEHICLES

The invention relates to a sealing profile for sealing an opening of a motor vehicle.

In one known sealing profile of this type, as shown in German patent DE 28 42 207 A1 (page 5, column 2), a sticky element of non-vulcanized rubber, for example butyl rubber (page 3, column 3), can be provided on the inside of the bridge. This rubber can be compressed only with comparative difficulty upon the fitting of the sealing profile on the flange such that undesirably high push-fitting forces result. Since the element should be unvulcanized, it can be made to adhere to the inside of the bridge only after the vulcanization of the sealing profile in an expensive, additional working step. Moreover, this must be carried out before the limbs of the U-shaped retaining part of the sealing profile are bent into their fitting positions. The known element can therefore not be used where the retaining part is given its U-shaped fitting shape either before or in the injection head of the extruder.

A similar proposal is known from DE 32 27 885 A1, FIG. 3. Here, a chamber of the retaining part which has previously been vulcanized in the customary way is lined with an evidently pasty butyl rubber part. The specification of the German document describes the disadvantages of this structure in the paragraph bridging pages 6 and 7. Since the chamber is smeared with the paste, the known flange covering cannot be further used after an adjustment.

From DE 31 47 801 A1 there is known a profile strip for sealing around the borders of windows. The receiving groove for the window is made in an EPDM profile. Since EPDM has very weak adhesive properties, a very thin surface layer of an adhesive-friendly rubber mixture is vulcanized onto the material in the receiving groove, with this rubber mixture being polar but not self-adhesive. For the assembly, rather a polar adhesive which sticks on the other hand to the window is additionally applied to the surface layer.

From DE 41 21 552 A1 it is known to conceal the visible surface of the retaining part with a strip of textile. For this, a first adhesive layer is coextruded onto the visible surface. The strip of textile is overlaid with a second adhesive layer of thermoplastic resin. For the concealment, the two adhesive layers are connected to one another by the application of pressure and heat.

From DE 33 46 070 A1 it is known to provide at least one limb of the U-shaped clamping region of the sealing profile with a pivotable extension of elastomeric material. The inner face of this which faces the flange is coated with a layer of adhesive. Upon the fitting, the extension is pivoted inwards, so that the layer of adhesive produces a fixed and sealing connection between the flange and the clamping region. In the embodiment shown in FIG. 3 of that reference, only a comparatively small clamping zone with adhesive extensions on the two limbs is used. Here, an adhesive layer can be provided on the inner face of the bridge (page 8, lines 26 and 27 and page 9, lines 6 to 9) for the fixing and centering during the fitting. Again, all these adhesive layers can first be positioned on the clamping zone only after the vulcanization of the sealing profile. This has the consequential disadvantages described above.

From DE 29 24 574 C2 it is known to provide a thin layer of heat-responsive material on the inside of the U-shaped retaining part in an additional working step after the vulcanization and before the bending together of the limbs of the retaining part. The layer consists for example of polyamide or ethylene-vinyl-acetate and extends from a retaining lip on the one limb, across the bridge, and as far as a retaining lip on the other limb. The retaining lips are intended to prevent an outward flow of the material layer during storage or during supply to the customer (column 2, lines 39 to 44). The fitter presses the retaining part onto a (bodywork) flange and then supplies heat from the outside to the retaining part, until the material foams at 70° to 120° C. and expands and the whole space between the retaining part and the flange is filled.

Various attempts have also been made to prevent the leakage of water between the retaining part and the flange into the interior of the motor vehicle, by applying a permanently plastic compound to the inside face of the bridge. Again, this can only be effected after the vulcanization of the sealing profile. The permanently plastic compound streams out from the dividing surfaces of the severed profile sections and contaminates the surroundings, including adjacent profile sections. Consequently, expensive cleaning actions are necessary. Also, as a result of the drying out and shrinkage of such permanently plastic compounds, one has a corresponding loss of sealing effect.

Basically, it is a universal fact that where there is a pressure gradient on motor vehicles at the fitted sealing profiles, then one must reckon on the danger that water will leak through the retaining part of the sealing profile.

SUMMARY OF THE INVENTION

It is the object of the invention to make possible for all sealing profiles of the generic type first described above a permanent sealing against leakage water in the retaining part with comparatively little cost.

This object is achieved by a sealing profile of the present invention for sealing an opening of a motor vehicle which has a closure element movable relative to the opening. The sealing profile includes a retaining part having a substantially U-shaped cross-section capable of being fitted onto a flange which extends around the opening of the motor vehicle. The retaining part includes a bridge and two limbs formed at the ends of the bridge; the bridge having an inner surface extending between the limbs. Fixed sealingly to the retaining part and which is to seal against the closure element of the motor vehicle is at least one sealing part. A continuous foamed open-cell sealing strand is connected to and projects from the inner surface of the bridge between the two limbs and is positioned for engagement with a flange inserted between the limb. The sealing strand has a permanent elasticity and permanent self-adhesive property, and is of a sealing compound having an at least partially vulcanized elastomeric mixture. The strand is connected to the bridge by its own adhesiveness.

The retaining part preferably consists of elastomeric material, in particular soft rubber. The retaining part can be made with or without embedded reinforcement, for example twisting wire or metallic strip. As required, one or more retaining lips can be formed on the inside of one or both limbs of the retaining part. The sealing compound according to the invention can be utilized in any given sealing part in a way which avoids, in most cases, any additional working step.

Preferably, the sealing compound is introduced during the course of coextrusion together with the manufacture of the sealing profile and is vulcanized together with the sealing profile. The thus vulcanized sealing strand is connected permanently to the bridge, and therefore cannot fall form the retaining part or swell out from it during storage and transport. Therefore, until the further use of the severed sections of the sealing profile, one always has clean dividing surfaces which can be subjected to further processing without the need for cleaning or other preparation measures. In the coextrusion of the sealing compound with the retaining part and the at least one sealing part, the limbs of the retaining part are formed into their final state either before or in the injection head. One can therefore avoid a deformation of the retaining part after the vulcanization stage. If on the other hand the sealing compound is also supplied at the same time to the bridge at the injection head, this can be effected for example by a nozzle in the retaining part which is not yet closed or which is not yet fully closed. It is advantageous that the conversion of the sealing compound into the sealing strand is effected simultaneously with the vulcanization of the sealing profile, i.e. without additional expense from the point of view of the technical process.

The sealing profile can be cut into sections having ends, each end having a dividing surface. The dividing surfaces of the ends can be permanently and sealingly connected to each other. The separation of the sealing profiled into sections is preferably done after the cooling of the sealing profile and possibly after the bending of the limbs into their final state. The connection of the dividing surfaces of the sections can be effected in the rubber factory, so that the motor vehicle manufacturer can be supplied with such sealing profile rings finished for the assembly line. This ensures that even in the region of the sealing strand, no gaps remain for the penetration of leakage water.

The dividing surfaces can be connected by use of a vulcanization adhesive. This provides a trouble-free connection which can be achieved by the use of a vulcanization paste or cold-setting adhesive.

These and further features and advantages of the invention will be described in more detail hereinafter, with reference to a number of embodiments which are given by way of example and which are illustrated in the drawings.

DETAILED DESCRIPTION

Figure 1:
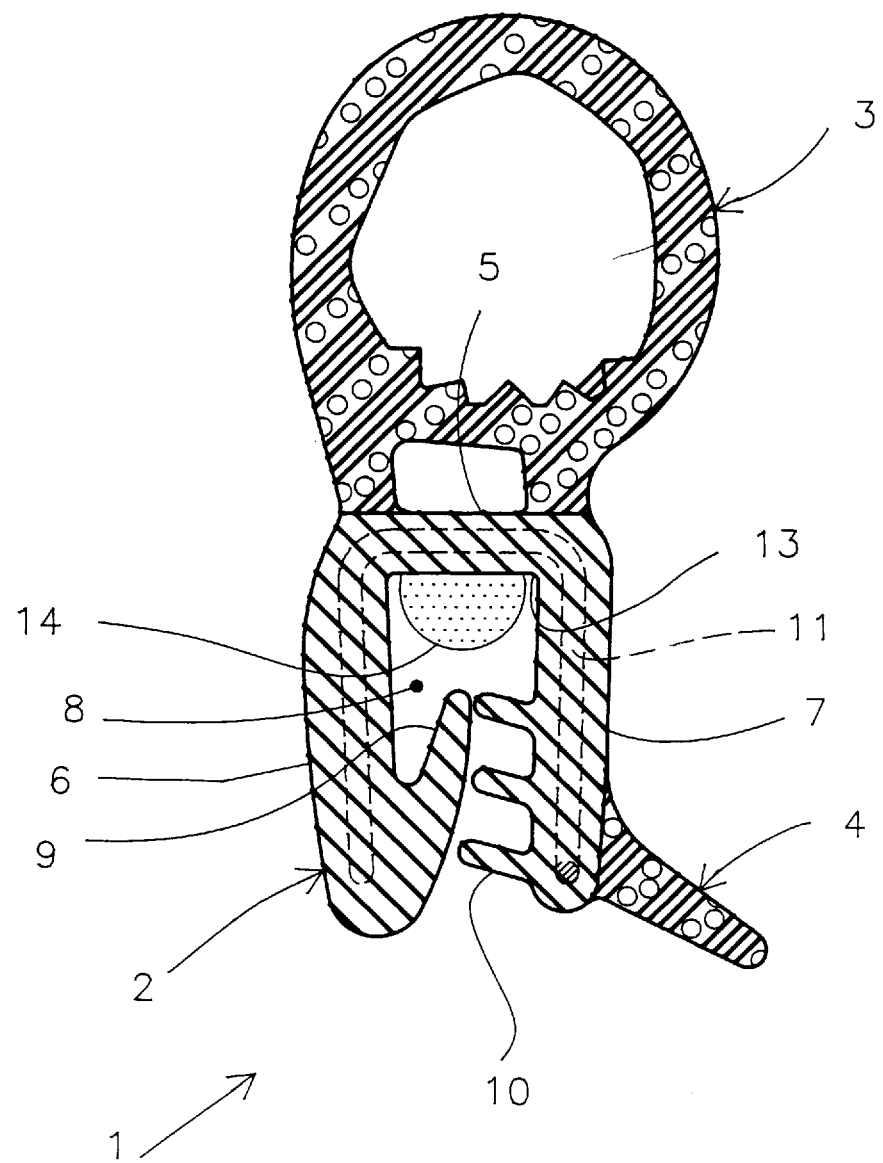
FIG. 1 is a cross-section through a first embodiment of a sealing profile.

FIG. 1 shows a sealing profile comprising 1 a retaining part 2 and sealing parts 3 and 4 formed on the retaining part 2 by coextrusion.

The retaining part 2 consists preferably of soft rubber and has a substantially U-shaped cross-section, with a bridge 5 and limbs 6 and 7 formed thereon. At least one retaining lip 9 and 10 extends from each limb 6, 7 into a channel 8 through the retaining part 2. Additionally, a reinforcement 11 is embedded within the retaining part 2. In the case of FIG. 1, the reinforcement 11 consists of twisting wire, although it could alternatively consist of a metallic sheet metal strip or other materials, which bestow on the retaining part 2 the strength and shape stability which are necessary in use.

The retaining part 2 is designed and equipped to be a push fit on a flange 12 (FIG. 2) which extends around an opening of a motor vehicle which is to be sealed, and is designed and equipped to be held securely in place there.

The sealing parts 3, 4 are fixed sealingly to the retaining part 2 and should reliably provide a seal in relation to a closure member of the motor vehicle which is movable relative to the opening. For this purpose the sealing parts 3, 4 are made from expanded rubber which is excellent for the coextrusion with the soft rubber of the retaining part 2 and can be connected permanently to the retaining part 2.

Figure 5:
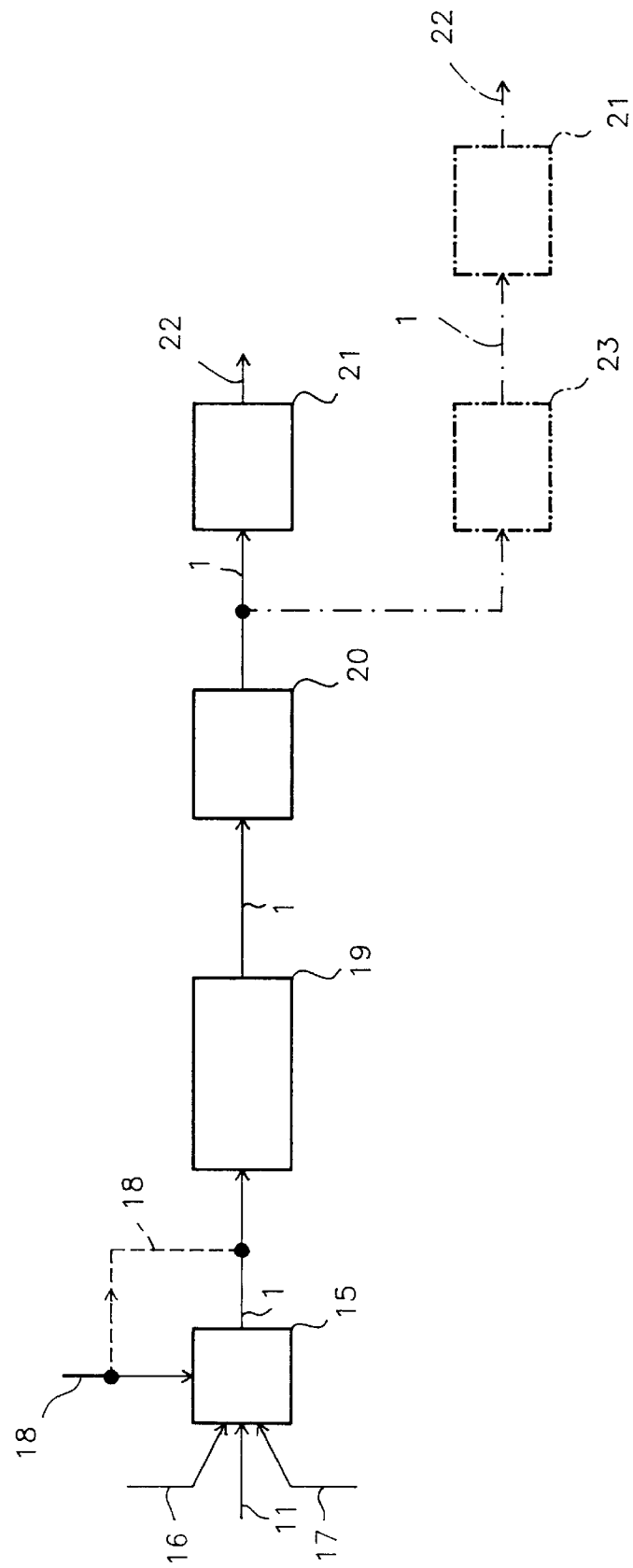
FIG. 5 is a block diagram showing different production paths for the manufacture of the sealing profile.

An inner surface 13 of the bridge 5 carries a sealing strand 14 which is adhesively stuck thereto. The sealing strand 14, as will be described in more detail hereinafter in connection with FIG. 5, is created from an elastomeric mixture by vulcanization and is permanently elastic and of a foamed open-cell structure, and is permanently sticky both on the outer face and on the inner face. Thus, the sealing strand 14 adheres to the inner surface 13 on account of its inherent stickiness. Since the sealing strand 14 is also stable in terms of shape, it does not change its position relative to the retaining part 2, even when sections are cut off from the finished sealing profile 1 and, possibly after further processing, are finally fitted on the motor vehicle. One therefore always has clean neat dividing surfaces on the sealing profile, which permits an easy and accurately fitting ready-to-use manufacture of the sealing profile.

The dividing surfaces thus created by cutting off the sections can be permanently and sealingly connected to each other by different means which are known per se. This applies also to the dividing surfaces of the sealing strand 14. This connection of the dividing surfaces can be effected for example by the use of vulcanization adhesive, vulcanization paste or cold setting adhesive, if closed rings are to be made from the sections of the sealing profile 1, before the section of the sealing profile 1 is fitted to the motor vehicle.

Figure 2:
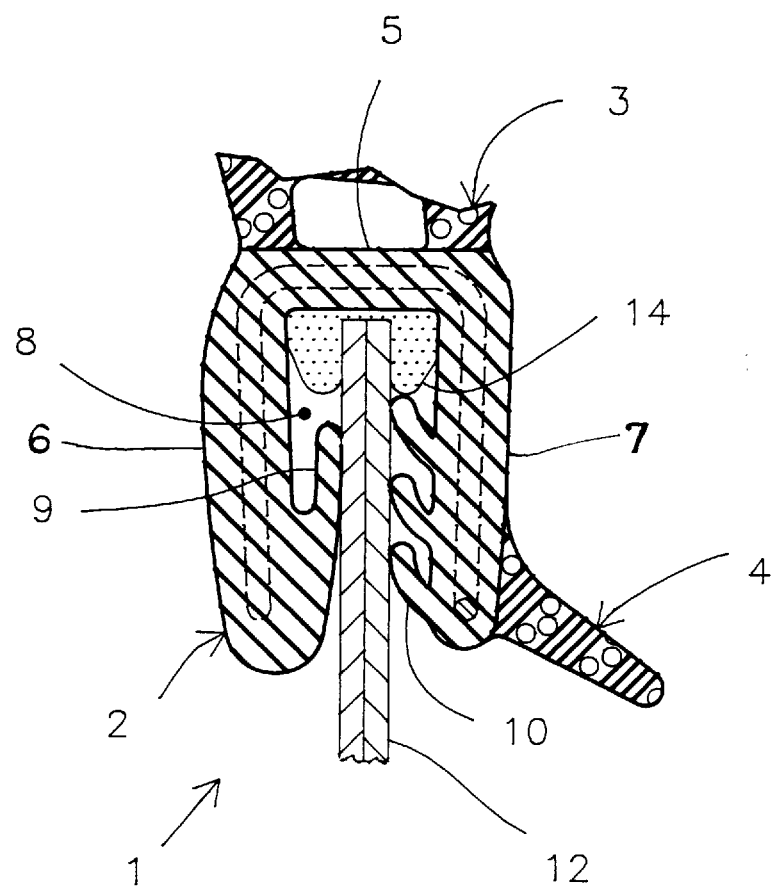
FIG. 2 is a part of the cross-section shown in FIG. 1 in the fitted state.

FIG. 2 shows the sealing profile 1 as it is fitted on the flange 12. For this, the retaining part 2 has the open side of its cross-section pushed over the flange 12, until the end face of the flange 12 has compressed the sealing strand 14 in the manner shown in FIG. 2. In this final fitting position, the initially open cells are closed by compression. The sticky cell walls adhere to one another. Moreover, both the side portions of the flange 12 which are in contact with the sealing strand 14, and also the limbs 6, 7, adhere to the outwardly sticky sealing strand 14.

During the pushing of the retaining part 2 onto the flange 12, the retaining lips 9 and 10 are deformed and are biassed against the opposing side faces of the flange 12. The retaining lips 9, 10 in this way set up static frictional forces which make it difficult for the sealing profile 1 to be pulled off the flange 12. Moreover, the retaining lips 10 which are thus biassed into contact with the flange 12 prevent the undesirable penetration of leakage water into the channel 8.

If leakage water should nevertheless come to be present in the channel 8 in spite of the retaining lips 10, the perfect sealing by the sealing strand 14 prevents such leakage water from leaking between the bridge 5 and the flange 12 and being able to enter the interior of the motor vehicle.

The sealing profile 1 shown in FIGS. 1 and 2 is particularly suitable as a tailgate seal or rearward-facing door seal for motor vehicles.

In all the figures of the drawings, the same parts are provided with the same respective reference numerals.

Figure 3:
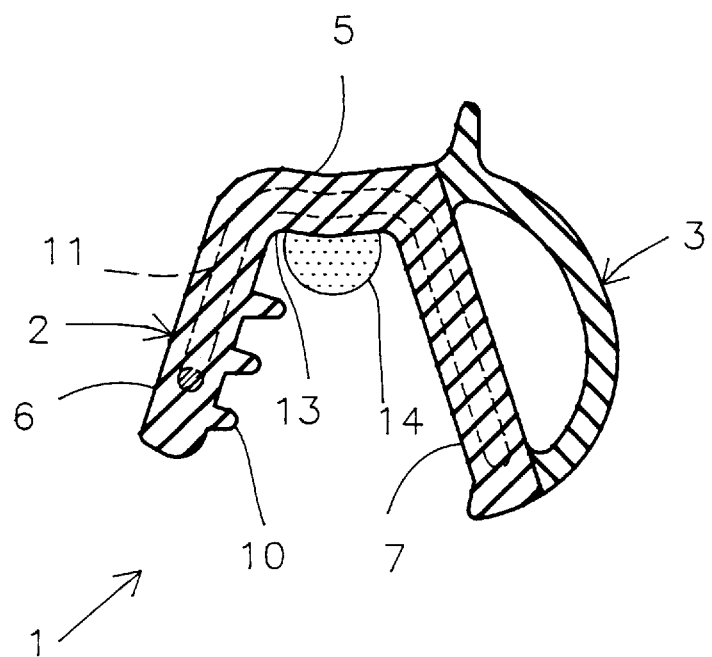
FIG. 3 is a cross-section through another embodiment of the sealing profile.

FIG. 3 shows a sealing profile 1 which finds use as a seal for a sliding roof. Here, the retaining part 2 of soft rubber which a hardness of for example 65 Shore A is coextruded with the sealing part 3 of soft rubber having a hardness of 45 Shore A.

Figure 4:
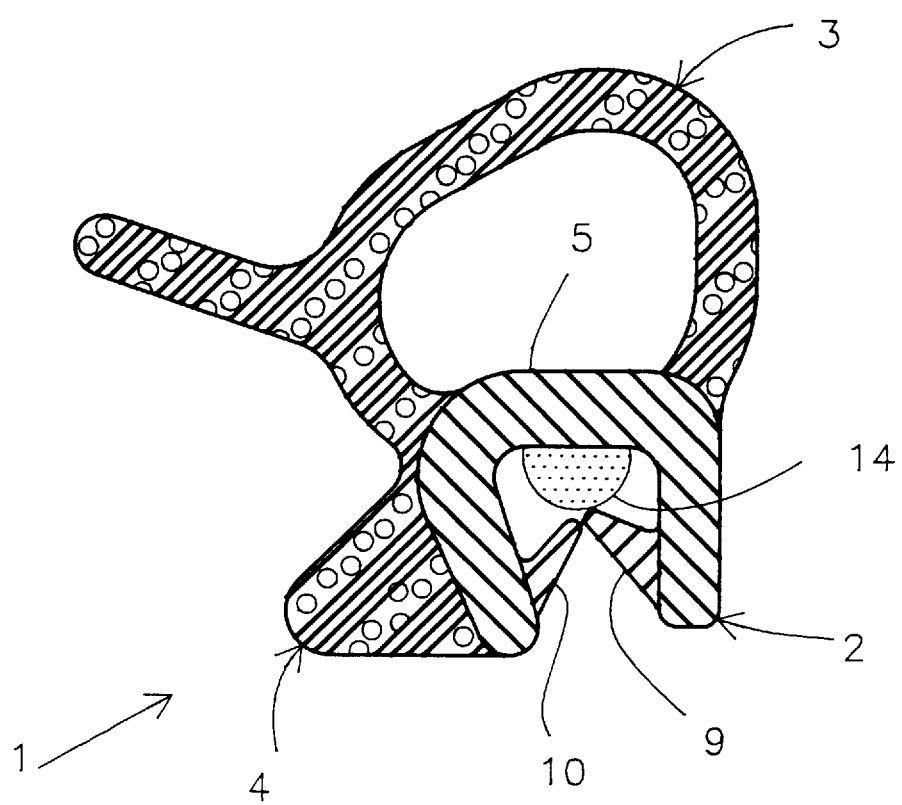
FIG. 4 is a cross-section through a further embodiment of the sealing profile.

The sealing profile 1 shown in FIG. 4 can be used for the sealing of a tailgate or a rearward-facing door of a motor vehicle.

The retaining part 2 is here manufactured without reinforcement from hard rubber having a hardness of 90 Shore A. Coextruded with the retaining part 2 are the retaining lips 9, 10 of soft rubber with a hardness of 65 Shore A and the sealing parts 3, 4 of expanded rubber having a hardness of 20 Shore A. These material specification examples can be changed selectively according to the intended usage. In all cases one can ensure that, even without reinforcement within the retaining part 2, the retaining part 2 can be seated sufficiently fast on the associated bodywork flange, the latter not being shown in FIG. 4 for simplification.

In the block diagram of FIG. 5, the reinforcement 11, and elastomeric material 16 for the retaining part 2, an elastomeric material 17 for the sealing part 3 and possibly 4, and an elastomeric mixture 18 for the sealing strand are shown as being supplied to an injection head 15 for the manufacture of a sealing profile 1 according to the preceding Figures. All these materials are coextruded from the injection head 15 into the sealing profile 1 which subsequently passes through a vulcanization zone 19 and a cooling device 20, before being cut into sections 22 in a cutting station 21.

The manufacturing process is particularly suitable for sealing profiles 1 where the retaining part 2 is already given it final shape configuration, ready for fitting, in the injection head 15, as is the case, for example, [for] FIG. 4.

If, on the other hand, the retaining part 2 is not yet closed or is not yet fully closed in the injection head 15, the elastomeric mixture 18 can be introduced into the retaining part 2 at a point subsequent to the injection head 15, as is indicated in FIG. 5 by broken lines.

A further alternative is also shown in FIG. 5 by chain-dotted lines. Here, the sealing profile, subsequent to the cooling device 20, is further processed, initially in a bending station 23, before it is cut into the sections 22[,] in the cutting station 21. In the bending station 23, the limbs 6 and 7 of the retaining part 2 in which a metallic reinforcement is embedded are bent to their final shape for fitting.

Examples of the composition of the elastomeric mixture 18 for the sealing compound are listed below. The constituents listed are provided in parts per hundred rubber.

EXAMPLE 1

| | |
|---|---|
| Natural rubber (NR) | 40 |
| Isobutene-isoprene rubber (IIR) | 30 |
| Chloro-isobutene-isoprene rubber (CIIR) | 20 |
| Ethylene-propylene-diene-terpolymer (EPDM) | 10 |
| Calcium carbonate | 30 |
| Siliceous chalk | 70 |
| Zinc oxide | 5 |
| Cross-linking means including sulfur | 5 |
| Mineral oil | 70 |
| Azodicarbonamide | 4 |
| Sulphohydrazide | 6 |

EXAMPLE 2

| | |
|---|---|
| Natural rubber (NR) | 50 |
| Isobutene-isoprene rubber (IIR) | 40 |
| Ethylene-propylene-diene-terpolymer (EPDM) | 10 |
| Calcium carbonate | 25 |
| Siliceous chalk | 60 |
| Carbon black | 10 |
| Zinc Oxide | 5 |
| Cross-linking means, including sulfur | 5 |
| Mineral oil | 75 |
| Azodicarbonamide | 5 |
| Sulphohydrazide | 4 |

EXAMPLE 3

| | |
|---|---|
| Natural rubber (NR) | 45 |
| Isobutene-isoprene rubber (IIR) | 45 |
| Ethylene-propylene-diene-terpolymer (EPDM) | 10 |
| Calcium carbonate | 30 |
| Siliceous chalk | 70 |
| Zinc Oxide | 5 |
| Cross-linking means, including sulfur | 4 |
| Mineral oil | 70 |
| Azodicarbonamide | 5 |
| Sulphohydrazide | 2.5 |

EXAMPLE 4

| | |
|---|---|
| Natural rubber (NR) | 40 |
| Isobutene-isoprene rubber (IIR) | 30 |
| Bromo-isobutene-isoprene rubber (BIIR) | 20 |
| Ethylene-propylene-diene-terpolymer (EPDM) | 10 |
| Calcium carbonate | 45 |
| Siliceous chalk | 60 |
| Zinc oxide | 5 |
| Cross-linking means, including sulfur | 5 |
| Mineral oil | 90 |
| Azodicarbonamide | 4 |
| Sulphohydrazide | 4 |

EXAMPLES 5, 6, 7, 8

Similar to that of examples 1, 2, 3, and 4 wherein the constituent natural rubber (NR) in each respective example 1, 2, 3, and 4 is substituted with a blend of natural rubber (NR) and styrene-butadiene rubber (SBR).

EXAMPLES 9, 10, 11, 12

Similar to that of example 1, 2, 3, and 4 wherein the constituent natural rubber (NR) in each respective example 1, 2, 3, and 4 is substituted with a blend of natural rubber (NR) and polybutadiene (BR).

EXAMPLES 13, 14, 15, 16

Similar to that of examples 1, 2, 3, and 4 wherein the constituent natural rubber (NR) in each respective example 1, 2, 3, and 4 is substituted with a blend of natural rubber (NR), styrene-butadiene rubber (SBR) and polybutadiene (BR).

EXAMPLE 17

The sealing compound has as a base material a blend of natural rubber (NR) and synthetic rubber.

EXAMPLE 18

The sealing compound has zinc oxide as a cross-linking means.

EXAMPLE 19

The sealing compound has natural rubber (NR), synthetic rubber, and only such an amount of cross-linking means that in the sealing compound only the natural rubber is vulcanized and the synthetic rubber in the sealing compound remains at least partially unvulcanized.

EXAMPLE 20

The sealing compound for the sealing strand has azodicarbonamide and/or sulphohydrazide as an initiator for the foaming process, with zinc oxide as a cross-linking agent.

The elastomeric mixtures defined in detail in the examples are sealing compound for sealing strands which can be converted by vulcanization into a permanently elastic, permanently sticky and foamed open-cell state. It is common to all the sealing compounds which are described in detail that they comprise as a base material a blend of natural rubber (NR) and synthetic rubber. In this way it is possible so to vulcanize the sealing compounds that only the natural rubber is cross-linked, with the synthetic rubber on the other hand remaining predominantly not cross-linked. Since the sealing compound is a mixture, it has the properties of a cross-linked vulcanized rubber in respect of its shape properties, and the properties of an unvulcanized rubber in respect of its stickiness. Optimum properties can be obtained by the designated addition of cross-linking auxiliary means such as are itemised in the examples.

I claim:

1. A sealing profile for sealing an opening of a motor vehicle which has a closure element movable relative to the opening, said sealing profile comprising:

a retaining part having a substantially U-shaped cross-section capable of being fitted onto a flange extending around the opening of the motor vehicle;

said retaining part including a bridge and two limbs formed at the ends of said bridge, said bridge having an inner surface extending between the limbs;

at least one sealing part fixed sealingly to the retaining part and which is to seal against the closure element of the motor vehicle; and a continuous foamed open-cell sealing strand connected to and projecting from the inner surface of said bridge between said two limbs, said sealing strand being positioned for engagement with a flange inserted between said limbs, said sealing strand having a permanent elasticity and permanent self-adhesive property, said sealing strand being an adhesive sealing compound comprising an at least partially vulcanized elastomeric mixture, said strand being connected to said bridge by its own adhesiveness.

2. A sealing profile according to claim 1 wherein said sealing profile is a cut section having ends, each of said ends comprising a dividing surface, said dividing surfaces of said ends being permanently and sealingly connected to each other.

3. A sealing profile according to claim 2 wherein the connection of the dividing surfaces is effected by a vulcanization adhesive.

4. A sealing profile according to claim 2, said sealing strand being positioned for compression by the flange upon insertion of the flange into the retaining part, the compression effecting a collapsing of the cells and an adhesive sealing between the flange and the sealing strand by the adhesiveness of the sealing strand.

5. A sealing profile according to claim 1, said sealing strand being positioned for compression by the flange upon insertion of the flange into the retaining part, the compression effecting a collapsing of the cells and an adhesive sealing between the flange and the sealing strand by the adhesiveness of the sealing strand.

6. A sealing profile according to claim 1 wherein the sealing compound comprises the following constituents in parts per hundred rubber:

| | |
|---|---|
| Natural rubber (NR) | 40 |
| Isobutene-isoprene rubber (IIR) | 30 |
| Chloro-isobutene-isoprene rubber (CIIR) | 20 |
| Ethylene-propylene-diene-terpolymer (EPDM) | 10 |
| Calcium carbonate | 30 |
| Siliceous chalk | 70 |
| Zinc oxide | 5 |
| Cross-linking means including sulfur | 5 |
| Mineral oil | 70 |
| Azodicarbonamide | 4 |
| Sulphohydrazide | 6 |

7. A sealing profile according to claim 6 wherein the constituent natural rubber (NR) is respectively substituted by a blend of natural rubber (NR) and styrene-butadiene rubber (SBR).

8. A sealing profile according to claim 6 wherein the constituent natural rubber (NR) is respectively substituted by a blend of natural rubber (NR) and polybutadiene (BR).

9. A sealing profile according to claim 6 wherein the constituent natural rubber (NR) is respectively substituted by a blend of natural rubber (NR), styrene-butadiene rubber (SBR) and polybutadiene (BR).

10. A sealing profile according to claim 1 wherein the sealing compound comprises the following constituents in parts per hundred rubber:

| | |
|---|---|
| Natural rubber (NR) | 50 |
| Isobutene-isoprene rubber (IIR) | 40 |
| Ethylene-propylene-diene-terpolymer (EPDM) | 10 |
| Calcium carbonate | 25 |
| Siliceous chalk | 60 |
| Carbon black | 10 |
| Zinc Oxide | 5 |
| Cross-linking means, including sulfur | 5 |
| Mineral oil | 75 |
| Azodicarbonamide | 5 |
| Sulphohydrazide | 4 |

11. A sealing profile according to claim 10 wherein the constituent natural rubber (NR) is respectively substituted by a blend of natural rubber (NR) and styrene-butadiene rubber (SBR).

12. A sealing profile according to claim 10 wherein the constituent natural rubber (NR) is respectively substituted by a blend of natural rubber (NR) and polybutadiene (BR).

13. A sealing profile according to claim 10 wherein the constituent natural rubber (NR) is respectively substituted by a blend of natural rubber (NR), styrene-butadiene rubber (SBR) and polybutadiene (BR).

14. A sealing profile according to claim 1 wherein the sealing compound comprises the following constituents in parts per hundred rubber:

| | |
|---|---|
| Natural rubber (NR) | 45 |
| Isobutene-isoprene rubber (IIR) | 45 |
| Ethylene-propylene-diene-terpolymer (EPDM) | 10 |
| Calcium carbonate | 30 |
| Siliceous chalk | 70 |
| Zinc Oxide | 5 |
| Cross-linking means, including sulfur | 4 |
| Mineral oil | 70 |
| Azodicarbonamide | 5 |
| Sulphohydrazide | 2.5 |

15. A sealing profile according to claim 14 wherein the constituent natural rubber (NR) is respectively substituted by a blend of natural rubber (NR) and styrene-butadiene rubber (SBR).

16. A sealing profile according to claim 14 wherein the constituent natural rubber (NR) is respectively substituted by a blend of natural rubber (NR) and polybutadiene (BR).

17. A sealing profile according to claim 14 wherein the constituent natural rubber (NR) is respectively substituted by a blend of natural rubber (NR), styrene-butadiene rubber (SBR) and polybutadiene (BR).

18. A sealing profile according to claim 1 wherein the sealing compound comprises the following constituents in parts per hundred rubber:

| | |
|---|---|
| Natural rubber (NR) | 40 |
| Isobutene-isoprene rubber (IIR) | 30 |
| Bromo-isobutene-isoprene rubber (BIIR) | 20 |
| Ethylene-propylene-diene-terpolymer (EPDM) | 10 |
| Calcium carbonate | 45 |
| Siliceous chalk | 60 |
| Zinc oxide | 5 |
| Cross-linking means, including sulfur | 5 |
| Mineral oil | 90 |
| Azodicarbonamide | 4 |
| Sulphohydrazide | 4 |

19. A sealing profile according to claim 18 wherein the constituent natural rubber (NR) is respectively substituted by a blend of natural rubber (NR) and styrene-butadiene rubber (SBR).

20. A sealing profile according to claim 18 wherein the constituent natural rubber (NR) is respectively substituted by a blend of natural rubber (NR) and polybutadiene (BR).

21. A sealing profile according to claim 18 wherein the constituent natural rubber (NR) is respectively substituted by a blend of natural rubber (NR), styrene-butadiene rubber (SBR) and polybutadiene (BR).

22. A sealing profile according to claim 1 wherein the sealing compound for the sealing strand comprises as base material a blend of natural rubber (NR) and synthetic rubber.

23. A sealing profile according to claim 1 wherein the sealing compound for the sealing strand comprises zinc oxide as cross-linking means.

24. A sealing profile according to claim 1 wherein the sealing compound for the sealing strand contains natural rubber (NR), synthetic rubber, and only such an amount of cross-linking means that in the sealing compound only the natural rubber is vulcanized and the synthetic rubber in the sealing compound remains at least partially unvulcanized.

25. A sealing profile according to claim 1 wherein the sealing compound for the sealing strand comprises azodicarbonamide as an initiator for the foaming.

26. A sealing profile according to claim 1 wherein the sealing compound for the sealing strand comprises sulphohydrazide as an initiator for the foaming.

* * * * *